(12) United States Patent
Janarthanam et al.

(10) Patent No.: US 9,956,931 B2
(45) Date of Patent: May 1, 2018

(54) ELECTRICAL POWER SYSTEM FOR HYBRID VEHICLES

(71) Applicant: FORD GLOBAL TECHNOLOGIES, LLC, Dearborn, MI (US)

(72) Inventors: Suriyaprakash A. Janarthanam, Westland, MI (US); Hilde A. Heremans, Farmington Hills, MI (US); Mark J. Ferrel, Brighton, MI (US); Wayne M. Thompson, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 771 days.

(21) Appl. No.: 14/244,068

(22) Filed: Apr. 3, 2014

(65) Prior Publication Data

US 2015/0283963 A1    Oct. 8, 2015

(51) Int. Cl.
| | | |
|---|---|---|
| *B60R 16/033* | (2006.01) | |
| *B60K 6/48* | (2007.10) | |
| *B60L 11/00* | (2006.01) | |
| *B60L 11/14* | (2006.01) | |
| *B60L 11/18* | (2006.01) | |
| *B60L 15/20* | (2006.01) | |

(52) U.S. Cl.
CPC .............. *B60R 16/033* (2013.01); *B60K 6/48* (2013.01); *B60L 11/005* (2013.01); *B60L 11/14* (2013.01); *B60L 11/1853* (2013.01); *B60L 11/1861* (2013.01); *B60L 11/1864* (2013.01); *B60L 11/1877* (2013.01); *B60L 15/20* (2013.01); *B60L 15/2009* (2013.01); *B60L 2210/10* (2013.01); *B60L 2220/46* (2013.01); *B60L 2240/26* (2013.01); *B60L 2240/547* (2013.01); *B60L 2240/549* (2013.01); *B60L 2250/26* (2013.01); *B60L 2260/26* (2013.01); *B60L 2260/28* (2013.01); *Y02T 10/6221* (2013.01); *Y02T 10/645* (2013.01); *Y02T 10/70* (2013.01); *Y02T 10/7005* (2013.01); *Y02T 10/7022* (2013.01); *Y02T 10/7044* (2013.01); *Y02T 10/7061* (2013.01); *Y02T 10/7077* (2013.01); *Y02T 10/7216* (2013.01); *Y02T 10/7275* (2013.01)

(58) Field of Classification Search
CPC .................................................... B60R 16/033
USPC .......................................................... 307/9.1
See application file for complete search history.

(56) References Cited

U.S. PATENT DOCUMENTS

| | | |
|---|---|---|
| 8,188,616 B2 | 5/2012 | Nordstrom et al. |
| 2012/0013424 A1 | 1/2012 | Gonzales et al. |
| 2014/0200755 A1* | 7/2014 | Sisk ........................ B60L 11/12 701/22 |

OTHER PUBLICATIONS

Ria Pereira, Plug-In Hybrid Vehicle (PHEV) Component Pre-Heater, (2013) Honors Theses, Paper 2272.

* cited by examiner

*Primary Examiner* — Joseph Chang
(74) *Attorney, Agent, or Firm* — David B. Kelley; MacMillan, Sobanski & Todd, LLC (57) ABSTRACT

A modular battery and power control system provides a range of electrical power to high-voltage and low-voltage power demand systems in a hybrid vehicle. The modular battery and power control system provides a single high-voltage modular battery pack that is selectively connected to high-voltage and low-voltage demand systems by a switch system. The switch system is controlled by a voltage controller module which monitors power demand and charge states of the electrical system and determines the switch positions to effect the indicated electrical demands of the hybrid vehicle.

20 Claims, 6 Drawing Sheets

Fig. 5

ELECTRICAL POWER SYSTEM FOR HYBRID VEHICLES

BACKGROUND OF THE INVENTION

This invention relates in general to internal combustion and electric powered hybrid vehicles. In particular, this invention relates to an improved electrical connection system for such hybrid vehicles.

Hybrid electric vehicles, generally, are vehicles that use electricity, to at least some degree, to supply motive power or limit the use of conventional internal combustion (IC) power sources. Hybrid vehicles are often defined by their powertrain layout and the degree to which electric motors influence power consumption. Two broad categories of hybrid vehicle powertrains, having both IC engines and electric propulsion, are parallel hybrids and series hybrids. Parallel hybrids, generally, have a powertrain layout where an IC power source and an electric power source combine to provide power to the wheels. Alternatively, some parallel hybrids connect the IC source and the electric power source to a common point, such as a transmission, and transmit power to the wheels from that point. Series hybrids, generally, use electric motors to drive the wheels and an IC engine drives a generator to augment/charge the batteries or power the motors directly.

Hybrid vehicles may also be categorized by the degree of hybridization, the amount of propulsion available from an electrically powered source. Full hybrids, which may be series or parallel powertrain arrangements, typically can drive the wheels by the IC engine, batteries powering electric motors, or a combination of both. Mild hybrids, on the other hand, rely on the IC engine for the main source of motive power and utilize electric power to improve efficiency. Some mild hybrids improve IC engine efficiencies by limiting the conditions that call for engine power. For example, IC engines having starter/alternator systems will shut the engine off during idling conditions and run accessories through an accessory drive electric motor. The starter/alternator will restart the engine when the driving cycle is initiated or when a secondary electric motor driving capacity is exceeded. Other mild hybrids augment IC engine output by using a motor/generator on the non-driving wheels to capture braking energy to recharge batteries. These motors may also provide limited driving power prior to the IC engine demand.

Many hybrid architectures, particularly full hybrids and mild hybrids, rely on a low-voltage battery source, for example a conventional 12 volt battery to start the IC engine or power 12 volt vehicle electrical loads, and a high-voltage battery source, for example a 48 volt to a 300-plus volt source to store and power electric assist motors, transmission motors or wheel motors. Because vehicle weight directly impacts efficiency and cost, there is a need to improve hybrid vehicles to fully utilize available power sources.

SUMMARY OF THE INVENTION

An embodiment contemplates a vehicle electrical system having a battery pack, a high-voltage circuit, a low-voltage circuit, and a power control system. The battery pack may be configured as a high-voltage battery pack that provides a high-voltage output to a high-voltage load demand from the high-voltage circuit. The low-voltage circuit includes a low-voltage load demand. The power control system determines a power demand requirement and also includes at least one switch. The switch is connected between the battery pack and the high and low-voltage circuits and is responsive to the power demand requirement such that the battery pack is placed in selective electrical communication with at least the low-voltage circuit to operate the low-voltage load demand. The at least one switch is also connected to the high-voltage circuit and is responsive to the power control system such that the battery pack is placed in selective electrical communication with the high and low-voltage circuits.

An embodiment may also contemplate a vehicle electrical system for providing a plurality of voltage level outputs. The modular battery and power control system includes a modular battery pack, a DC/DC converter, and a switch system. The modular battery pack has a plurality of interconnected battery cells, the cells connected to provide a high-voltage output to a high-voltage connector. The DC/DC converter is configured to accept the high-voltage output of the modular battery pack and provide a low-voltage output to a low-voltage connector. The switch system includes a plurality of electrical contact points that connect the modular battery pack to at least one of the high voltage connector and the low-voltage connector. The switch system further includes a solenoid portion and a voltage controller module. The voltage controller module may be a unique module or may alternatively be part of a high-voltage battery controller module. The voltage controller module receives at least one input signal that is indicative of an electrical system power demand state. In one embodiment, the at least one input signal may be a key on-key off signal. The voltage controller selectively controls the solenoid portion in response to the at least one input signal to electrically connect the modular battery pack to at least one of the high-voltage connector and the low-voltage connector.

An embodiment may also contemplate hybrid vehicle electrical system having an electrical system with a multiple voltage load requirement. The hybrid vehicle has a high-voltage circuit having a high-voltage load demand and a low-voltage circuit having a low-voltage load demand. The hybrid vehicle also includes a modular battery pack configured to provide a high-voltage output; and at least one switch system connecting the modular batter pack to the high-voltage and low-voltage circuits. A voltage controller module receives at least one input signal that is indicative of an electrical system power demand state of the hybrid vehicle electrical system and selectively control the at least one switch system in response to the at least one input signal to electrically connect the modular battery pack to at least one of the high-voltage circuit and the low-voltage circuit. In certain embodiments of the hybrid vehicle, the electrical system is configured such that the at least one signal is one of a key on signal and a key off signal, and the electrical power demand state defines a low-voltage power demand when the at least one input signal is the key off signal. In other embodiments, the at least one switch is a change-over switch that is controlled by the voltage controller to connect the modular battery pack to the low-voltage circuit.

Thus, it is advantageous that an electrical system for a hybrid vehicle reduces the number of battery systems need to power a vehicle.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
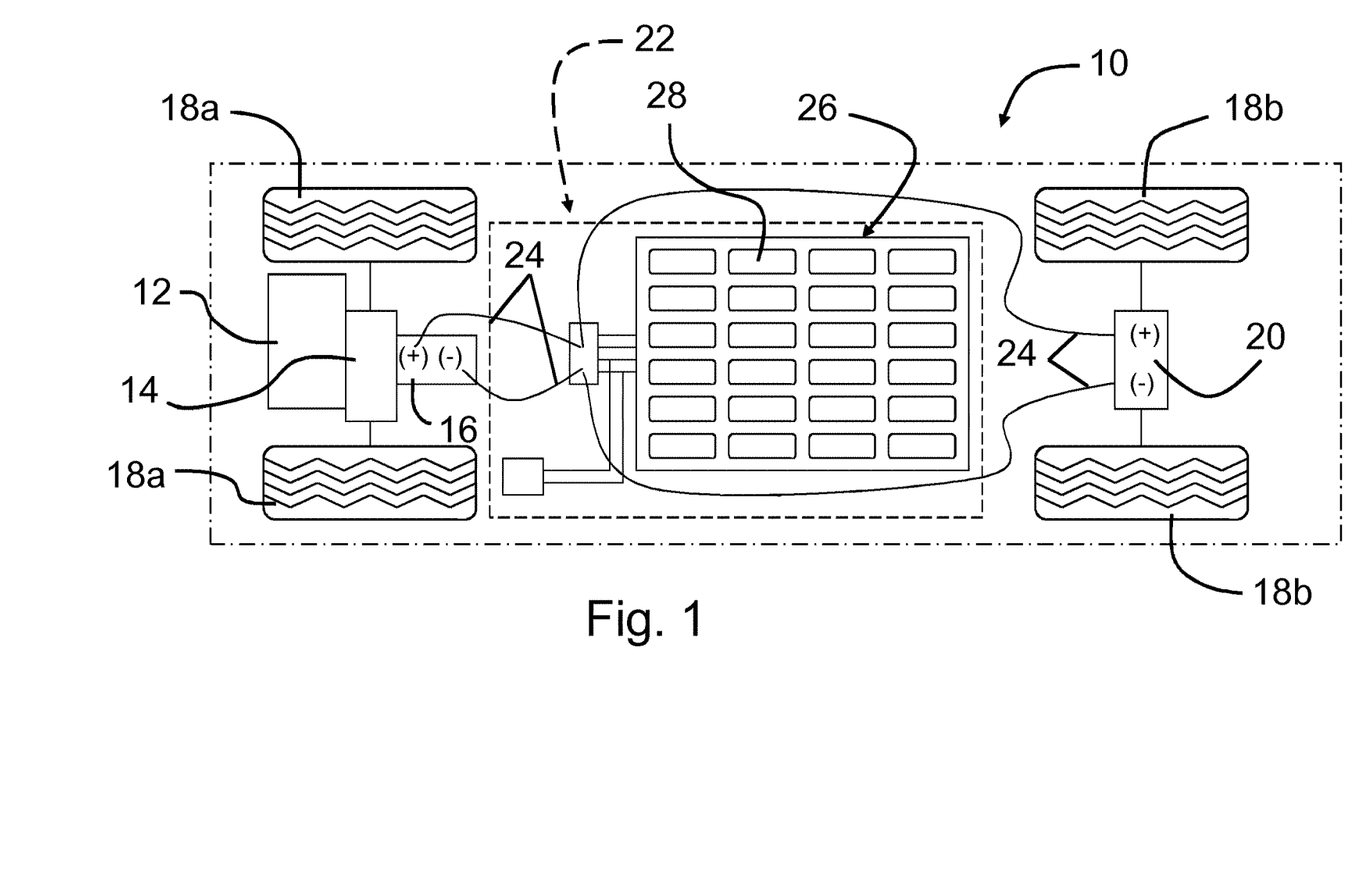
FIG. 1 is a schematic plan view of an embodiment of a mild hybrid vehicle powertrain layout.

Referring now to the drawings, FIG. 1 illustrates a schematic view of a mild hybrid vehicle and powertrain layout, shown generally at 10. The mild hybrid vehicle 10 includes an internal combustion (IC) engine 12, a transmission 14, and an electric assist motor (EAM) 16. The IC engine 12 drives the transmission 14 which, in turn, drives at least one wheel, shown as a front wheel 18a. In one embodiment of the mild hybrid vehicle, the EAM 16 may be configured as a starter/alternator which is configured to initially start the engine and restart the engine during efficiency shut down periods. Alternatively, EAM 16 may be configured to provide augmented power and regenerative braking, such as regenerative engine braking or regenerative pedal-actuated braking, through the transmission 14. In another aspect of the mild hybrid vehicle 10, a pavement-enabled, electric assist motor 20 may be connected to wheels, such as rear wheels 18b, which are not driven by the IC engine 12. The pavement-enabled electric assist motor 20 may provide regenerative braking and a power assist mode that augments the IC engine power and/or provides motive power prior to restarting the IC engine 12.

Figure 2:
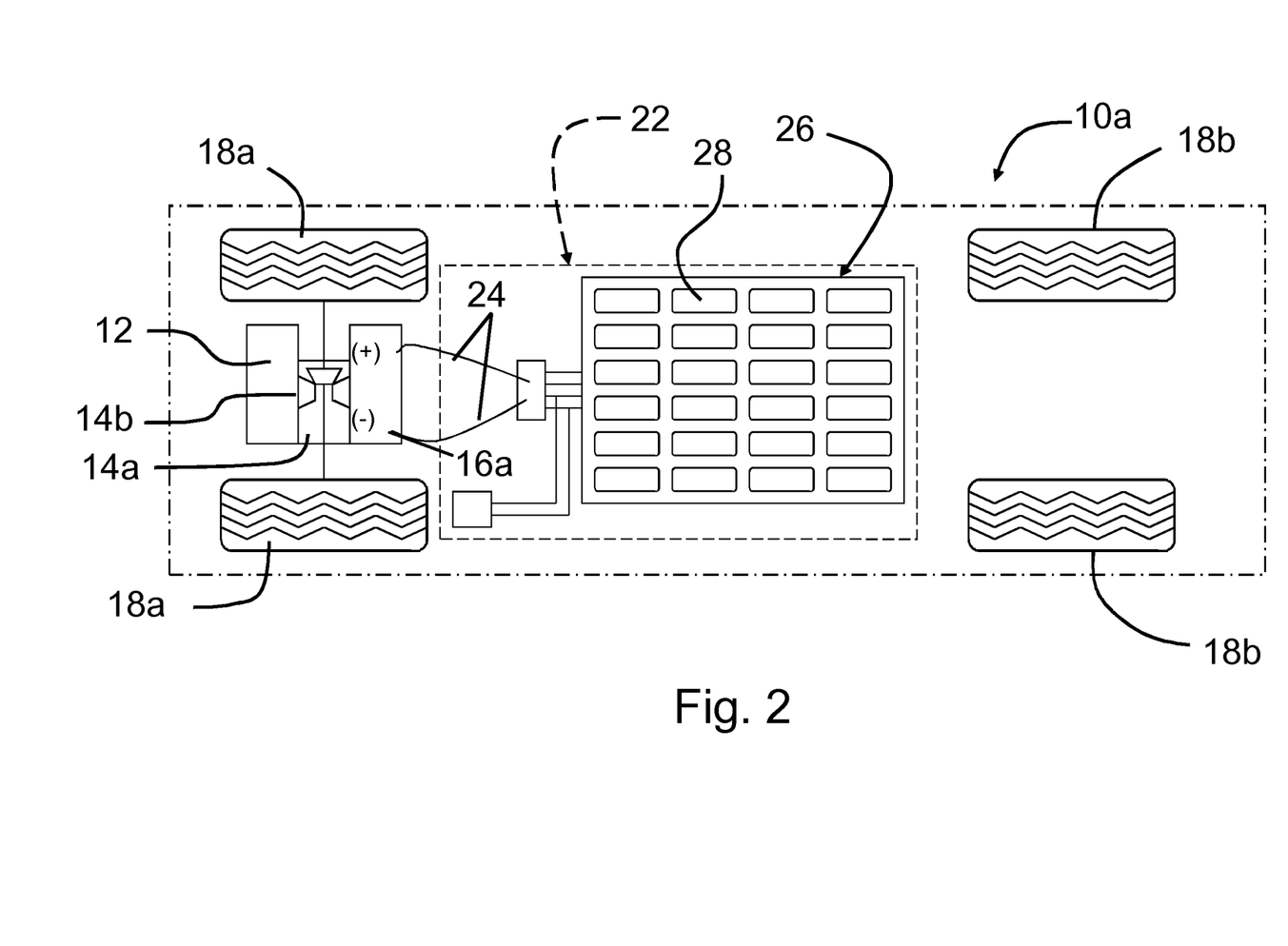
FIG. 2 is a schematic plan view of an embodiment of a full hybrid vehicle powertrain layout.

As shown in FIG. 2, a full hybrid vehicle is schematically illustrated, generally at 10a. The full hybrid system 10a may share several similar components of the mild hybrid system 10 of FIG. 1. Thus, the same reference numbers will be used to indicate the same or substantially the same components. The full hybrid vehicle 10a includes the IC engine 12 and an electric drive motor (EDM) 16a connected to a gear box 14a that may include a differential gear set or clutching arrangement to permit power input from either the IC engine 12 or the EDM 16a to the front wheels 18a and/or rear wheels 18b. Though the illustrated full hybrid vehicle is shown as a parallel hybrid powertrain layout, a series powertrain layout may also be provided. In such an arrangement, the wheels 18a may be connected to the EDM 16a and the IC engine 12 connected to a generator 14b. Additionally, a singular or second EDM, similar in arrangement to the EAM 20 of FIG. 1, may be provided. As shown in FIGS. 1 and 2, the hybrid vehicles 10 and 10a include a modular battery and power control (BPC) system, shown generally at 22. The modular BPC system 22 is connected to the EAM 16 or the EDM 16a by way of a cable or buss system 24.

Figure 3:
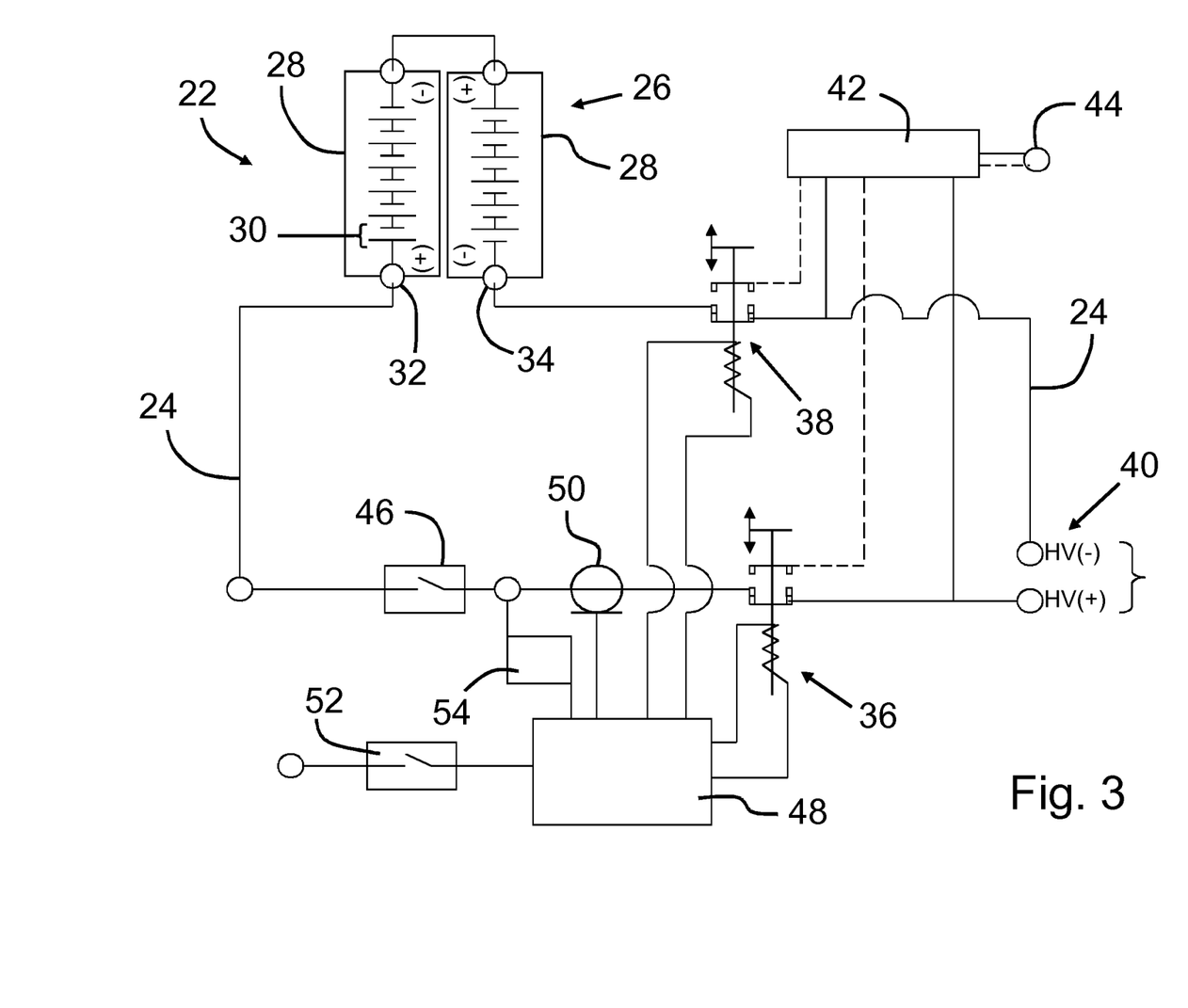
FIG. 3 is a schematic view of an embodiment of a portion of a hybrid vehicle electrical system having positive and negative contactors.

FIG. 3 will now be discussed, with reference to FIGS. 1 and 2, and illustrates a schematic view of an embodiment of the modular BPC system 22. The modular BPC system 22 includes a modular battery pack, indicated generally at 26.

The modular battery pack 26 is formed from a plurality of interconnected battery modules 28. Each module 28 includes one or more cells 30 that generate a basic unit voltage. For example, when the modules are formed from lead-acid cells, the basic unit voltage of each cell is about 2 volts. The modules may be formed from cells of any suitable composition, such as lithium-ion, nickel metal hydride, nickel cadmium, flow battery, and others. The cells 30 are connected in series to form an output voltage for the module 28. The cells 30 may be connected in any suitable number to provide the desired voltage output for the module 28. The modules 28 are then arranged, in any suitable number, and connected, either in parallel or series, to produce the desired voltage and current output for the modular battery pack 26. The modular battery pack 26 terminates in at least one positive and one negative output terminal 32 and 34, respectively.

In the illustrated embodiment, the modular battery pack 26 is connected, by way of the buss system 24, to an electrical switch system that includes a positive contactor, shown generally at 36, and a negative contactor, shown generally at 38. The contactors 36 and 38 selectively connect the modular battery pack 26 to high-voltage connectors 40 which may drive hybrid powertrain functions, particularly operation of the EAM 16 or the EDM 16a. In one embodiment, the positive and negative contactors 36 and 38 may be configured as double pole, single throw (DPST) switches.

In one embodiment, the high-voltage power level may be in a range of about 36 volts to about 360 volts. In another embodiment, the high-voltage power level may be about 250 volts to about 300 volts to drive the EDM 16a. In yet another embodiment, the high-voltage power level may be on the order of 48 volts, which may be used to drive the EAM 16, accessory systems such air conditioning, power steering, information systems, and the like. As used herein, it is understood that a high-voltage and a low-voltage may be different voltages with a difference of at least 24 volts between the "low" voltage and the "high" voltage.

The contactors 36 and 38 also function to selectively connect the modular battery pack 26 to a DC/DC converter 42 that is configured to output a relatively low-voltage power level, such as a 12 volt power level, to operate vehicular systems that may require 12 volt power supply. The DC/DC converter 42 includes a low-voltage connector 44 to supply low-voltage power to the vehicle. In this way, the modular BPC system 22 provides the functionality of separate high-voltage and low-voltage systems without the need to incorporate, package, or maintain a low-voltage storage system, such as a 12 volt battery. This improvement in packaging opens the use of certain premium space, especially under the hood and in proximity to the firewall, for other componentry or vehicle systems. In addition, the modular BPC system 22 may include a service disconnect 46 to electrically decouple the modular battery pack 26 from the circuit.

The switch system of the modular BPC system 22 includes a voltage controller module (VCM) 48. The VCM 48 includes a plurality of condition monitoring input signals, such as a current sensor 50, an ignition switch key on/off input 52, a battery charge state condition input 54, and other suitable inputs in order to determine the vehicle electrical state and proper power demand condition. These inputs permit the VCM 48 to determine the particular vehicle power demand, by way of a control algorithm and microprocessor within or connected to the VCM 48. The VCM 48 then actuates the contactors 36 and 38 to provide the required power level to the appropriate vehicle electrical systems. The voltage controller module may be a unique module or may alternatively be part of a high-voltage battery controller module.

Figures 6, 7:
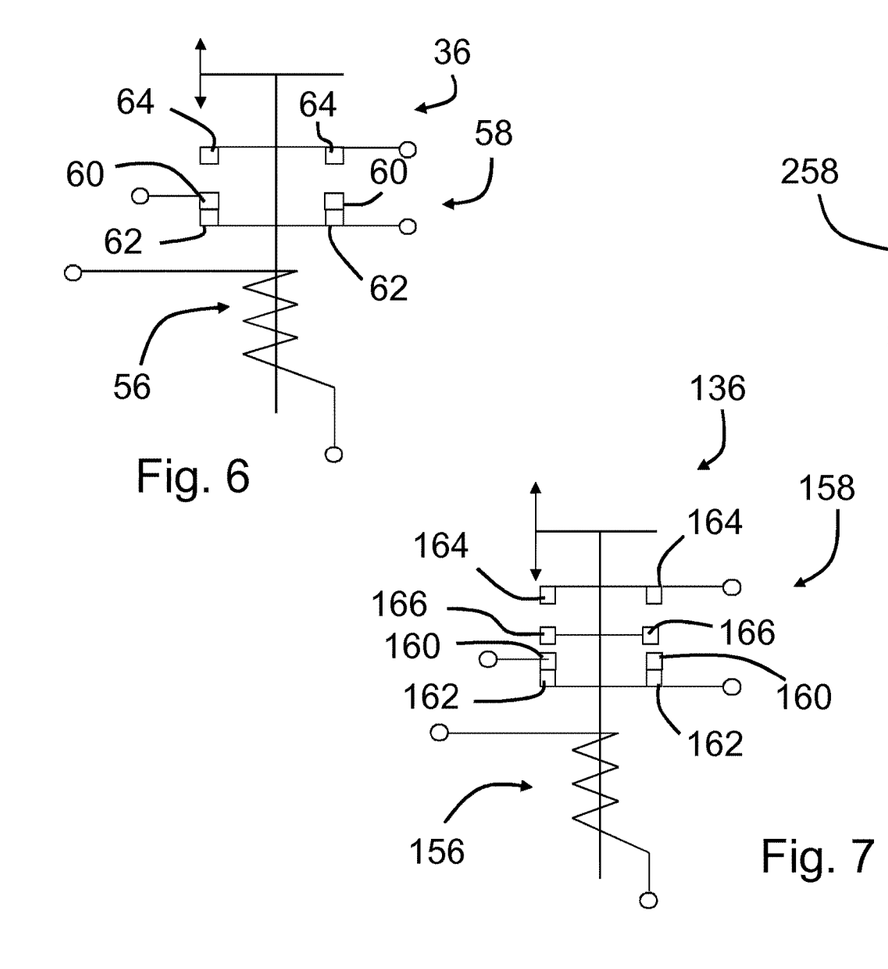
FIG. 6 is an enlarged schematic illustration of the contactor switch of FIG. 3.
FIG. 7 is an enlarged schematic illustration of the contactor switch of FIG. 4.

The contactors 36 and 38 are similar in construction and will be described in the context of positive contactor 36, as shown in FIGS. 3 and 6. The contactor 36 includes a solenoid portion, shown generally at 56, that is in communication with the VCM 48. The contactor 36 further includes a switching portion, shown generally at 58, that forms the selected electrical connections between desired circuit terminals, such as between an input circuit terminal 60 and one of a high/low-voltage circuit terminal 62 and a low-voltage circuit terminal 64. As used herein, the term "high/low" means both "high and low" voltage. The solenoid portion 56 actuates the switching portion 58 in response to a determination of the control algorithm in the VCM 48, that conditions exist to provide only low-voltage power or a combination of low-voltage and high-voltage power. Though shown as a linearly actuated switching mechanism, the contactor 36 may be a rotary actuated device, cantilevered contact device or fluid contact device, if desired.

In one example of system operation, the VCM 48 receives an input signal from the key on/off input 52 signaling a key on state. The VCM 48 determines, through the current sensor 50, that the service disconnect is connected and that the battery charge state is at a sufficient level to support vehicle driving operation, by way of the battery charge state condition input 54. The VCM 48 then actuates the positive and negative contactors 36 and 38 such that the input circuit terminal 60 is brought into electrical communication with the high/low-voltage circuit terminal 62. Power is then routed from the modular battery pack 26 to both the high-voltage connectors 40 and the DC/DC converter 42. The DC/DC converter then steps down the high-voltage power, supplied by the modular battery pack 26, to the low-voltage level and transmits that low-voltage power to the appropriate vehicle systems connected to the low-voltage connector 44.

When the VCM 48 senses that the ignition switch has been moved to a key off position, or moved away from a position calling for the operation of the IC engine, the VCM 48 analyzes inputs from the other condition sensors and determines a response sequence. In one example, the VCM 48 actuates the positive and negative contactors 36 and 38 such that the input circuit terminal 60 is brought into electrical communication with the low-voltage circuit terminal 64. In this condition, power from the modular battery pack 26 is supplied to the DC/DC converter 42, but not to the high-voltage connectors 40. Thus, vehicle subsystems that are permitted to operate without an engine-on condition can continue to operate without the need of a separate 12 volt power source, such as a conventional 12 volt lead-acid battery, a capacitor, or other additional stored energy device.

Figure 4:
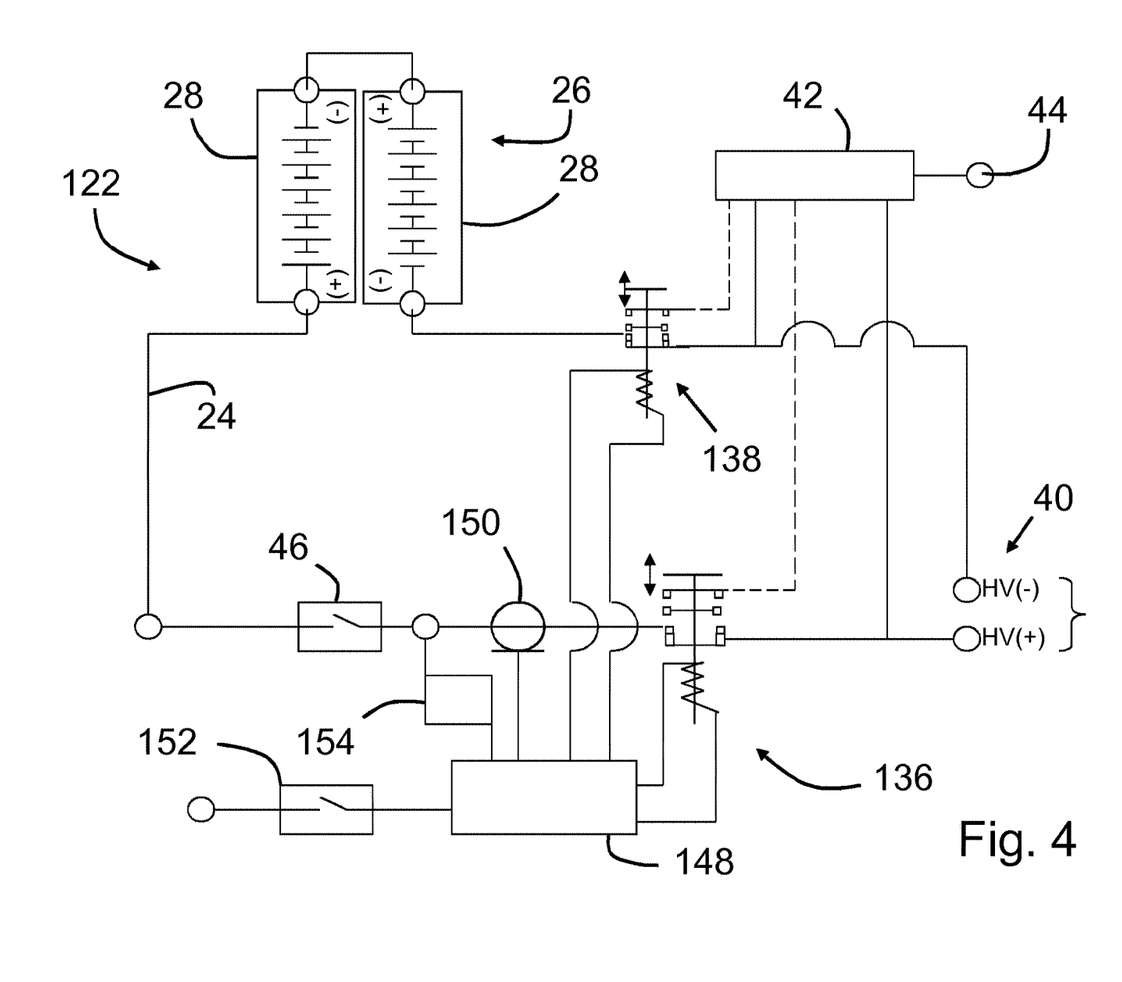
FIG. 4 is a schematic view of another embodiment of a portion of a hybrid vehicle electrical system, similar to FIG. 3, having three position contactors.

Referring now to FIG. 4, there is illustrated another embodiment of a modular BPC system, shown generally at 122. The modular BPC system 122 is similar to the modular BPC system 22, described above, and includes some of the same or similar elements. Elements which are the same will be identified by the same reference numbers. The modular BPC system 122 includes the modular battery pack, indicated generally at 26, having the interconnected battery modules 28. The modular battery pack 26 is connected, by way of the buss system 24, to a power-disconnect positive contactor (PDPC), shown generally at 136, and a power-disconnect negative contactor (PDNC), shown generally at 138. The PDPC 136 and PDNC 138 selectively connect the modular battery pack 26 to the high-voltage connectors 40 which may drive hybrid powertrain functions, particularly operation of the EAM 16 or the EDM 16a (shown in FIGS. 1 and 2). The PDPC 136 and PDNC 138 also function to selectively connect the modular battery pack 26 to the DC/DC converter 42 and the low-voltage connector 44. The modular BPC system 122 also may include the service disconnect 46.

The modular BPC system 122 includes a voltage controller module (VCM) 148. The VCM 148 includes a plurality of condition monitoring input signals similar to those of the modular BPC system 22, such as a current sensor 150, an ignition switch key on/off input 152, a battery charge state condition input 154, and other suitable inputs in order to determine the vehicle electrical state and proper power demand condition. These inputs also permit the VCM 148 to determine the particular vehicle power demand, by way of a control algorithm and microprocessor within or connected to the VCM 148. In addition, these inputs permit the VCM 148 to determine whether to electrically decouple the modular battery pack 26 from the high and low-voltage circuits of the vehicle. The VCM 148 then actuates the power-disconnect contactors 136 and 138 to provide the required connectivity to or isolation from the appropriate vehicle electrical systems.

The PDPC 136 and PDNC 138 are similar in construction and will be described in the context of the PDPC 136, as shown in FIGS. 4 and 7. The PDPC 136 includes a solenoid portion, shown generally at 156, that is in communication with the VCM 148. The PDPC 136 further includes a switching portion, shown generally at 158, that forms the selected electrical connections between desired circuit terminals, such as between an input circuit terminal 160 and one of a high/low-voltage circuit terminal 162 and a low-voltage circuit terminal 164. The switching portion 158 of the PDPC 136 further includes a neutral or isolation terminal 166. The isolation terminal 166 provides a positively engaged switch position that decouples the input circuit terminal 160 from electrical communication with the high-voltage connectors 40, the DC/DC converter 42, and the low-voltage connector 44. The solenoid portion 156 actuates the switching portion 158 in response to a determination of the control algorithm in the VCM 148, that conditions exist to provide only low-voltage power, a combination of low-voltage and high-voltage power, or that the remaining battery charge state has fallen below a predetermined threshold of charge. Selection of the switch position to the isolation terminal 166 shields the battery from parasitic current draw in order to provide an adequate power reserve, such as for engine start.

Figure 5:
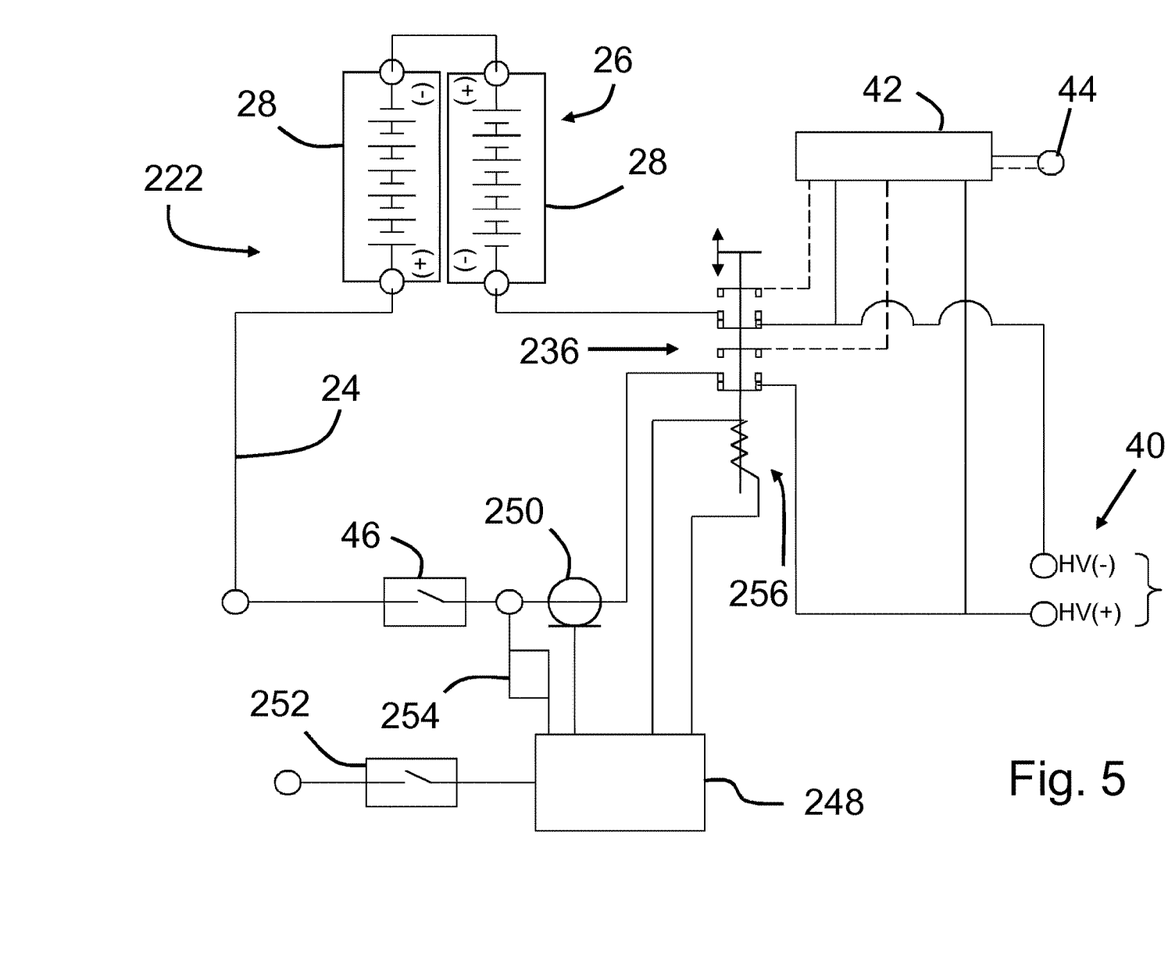
FIG. 5 is a schematic view of yet another embodiment of a portion of a hybrid vehicle electrical system having a change-over switch.

Referring now to FIG. 5, there is illustrated another embodiment of a modular BPC system, shown generally at 222. The modular BPC system 222 is generally similar to the modular BPC system 22, described above, and includes some of the same or similar elements. Elements which are the same will be identified by the same reference numbers. The modular BPC system 222 includes the modular battery pack, indicated generally at 26, having the interconnected battery modules 28. The modular battery pack 26 is connected, by way of the buss system 24, to a change-over switch, shown generally at 236. In one embodiment, the change-over switch 236 may be configured as a double pole, double throw (DPDT) switch. The change-over switch 236 selectively connects the modular battery pack 26 to both the positive and negative side of the high-voltage connectors 40 which may drive hybrid powertrain functions, particularly operation of the EAM 16 or the EDM 16a (shown in FIGS. 1 and 2). The change-over switch 236 also functions to selectively connect the modular battery pack 26 to positive and negative inputs to the DC/DC converter 42 and the low-voltage connector 44. The modular BPC system 222 also may include the service disconnect 46.

The modular BPC system 222 includes a voltage controller module (VCM) 248. The VCM 248 includes a plurality of condition monitoring input signals, which may be similar in certain aspects to those of the modular BPC system 22. The condition monitoring signals are provided to the VCM 248 by a current sensor 250, an ignition switch key on/off input 252, a battery charge state condition input 254, and other suitable inputs in order to determine the vehicle electrical state and proper power demand condition. These inputs also permit the VCM 248 to determine the particular vehicle power demand, by way of a control algorithm and microprocessor within or connected to the VCM 248. In certain embodiments of the modular BPC system 222, these inputs may permit the VCM 248 to determine whether to electrically decouple the modular battery pack 26 from the high and low-voltage circuits of the vehicle. The VCM 248 then actuates the change-over switch 236 to provide the required connectivity to or isolation from the appropriate vehicle electrical systems.

Figure 8:
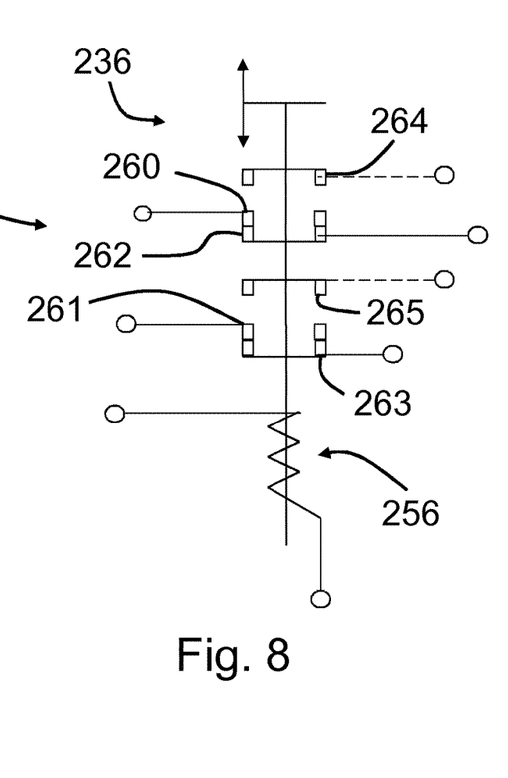
FIG. 8 is an enlarged schematic illustration of the change-over switch of FIG. 5.

The change-over switch 236 is illustrated in FIGS. 5 and 8 and includes a solenoid portion, shown generally at 256, that is in communication with the VCM 248. The change-over switch 236 further includes a switching portion, shown generally at 258, that forms the selected electrical connections between desired circuit terminals, such as between positive and negative input circuit terminals 260, 261 and positive and negative high/low-voltage circuit terminals 262, 263 and positive and negative low-voltage circuit terminals 264, 265. The switching portion 258 of the change-over switch 236 is capable of being actuated to a neutral or isolation position that is generally midway between the high/low-voltage contact point and the low-voltage contact point. Alternatively, the change-over switch 236 may include one or two isolation terminals, similar to isolation terminal 166, that provide a positively engaged switch position that decouples the input circuit terminals 260, 261 from electrical communication with the high-voltage connectors 40, the DC/DC converter 42, and the low-voltage connector 44. The solenoid portion 256 actuates the switching portion 258 in response to a determination of the control algorithm in the VCM 248, that conditions exist to provide only low-voltage power, a combination of low-voltage and high-voltage power, or that the remaining battery charge state has fallen below a predetermined threshold of charge. Selection of the switch position to the isolation position or terminal shields the battery from parasitic current draw in order to provide an adequate power reserve, such as for engine start.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle electrical system comprising:
   a high-voltage battery;
   a low-voltage circuit;
   a control system, including a switch connected between the battery and the low-voltage circuit, the control system configured to selectively switch the high voltage battery to electrical communication with only the low-voltage circuit based upon a power requirement.

2. The system of claim 1 further including a high-voltage circuit, the switch being connected to the high-voltage circuit and responsive to the control system such that the battery is placed in selective electrical communication with both the high/low-voltage circuits.

3. The system of claim 1 wherein the control system includes a voltage controller module configured to receive an indication of an electrical system power demand state and selectively control the switch in response to the power demand state indication.

4. The system of claim 3 wherein the indication is an input signal, which is one of a key-on signal and a key-off signal, the voltage controller module selectively controlling the switch such that the battery is electrically connected to a high-voltage circuit in response to the key-on signal.

5. The system of claim 3 wherein the indication is an input signal, which is indicative of the electrical system power demand state defining a low-voltage power demand, the voltage controller module selectively controlling the switch to electrically connect the battery to only the low-voltage circuit.

6. The system of claim 1 wherein the switch connects the battery to a DC/DC converter, which is electrically connected to the low-voltage circuit.

7. The system of claim 6 wherein the control system includes a voltage controller module configured to receive a key-on signal and a key-off signal, the voltage controller module selectively controlling the switch such that the battery is electrically connected to both a high-voltage circuit and the low-voltage circuit in response to the key-on signal and the battery is electrically connected only to the low-voltage circuit in response to the key-off signal.

8. A vehicle electrical system comprising:
   a battery having a high-voltage output to a high-voltage connector;
   a DC/DC converter configured to accept the high-voltage output and provide a low-voltage output to a low-voltage connector;
   a switch system comprising:
      electrical contact points that connect the battery to at least one of the high-voltage connector and the low-voltage connector;
      a solenoid;
      a controller configured to selectively control the solenoid in response to an input signal indicative of an electrical demand state to electrically connect the battery to both the high-voltage connector and the low-voltage connector or only the low-voltage connector.

9. The system of claim 8 wherein the battery has interconnected battery cells and the cell connection is a series cell connection.

10. The system of claim 9 wherein the controller is configured to determine one of a key-on and a key-off state.

11. The system of claim 10 wherein the controller connects the battery to the DC/DC converter in the key-off state.

12. The system of claim 8 wherein the electrical contact points of the switch system are part of a positive contactor and a negative contactor.

13. The system of claim 8 wherein the electrical contact points are part of a positive-disconnect positive contactor and a positive-disconnect negative contactor.

14. The system of claim 8 wherein the electrical contact points are part of a change-over switch.

15. The system of claim 8 wherein the high-voltage connector and the low-voltage connector are in electrical communication with portions of a vehicle having a high-voltage demand and a low-voltage demand, respectively.

16. A hybrid vehicle electrical system comprising:
a high-voltage circuit;
a low-voltage circuit;
a high-voltage battery;
a switch system selectively connecting the battery to the high-voltage and low-voltage circuits;
a controller configured to selectively control the switch system in response to an input signal, indicative of an electrical demand state, to electrically connect the battery to the high/low-voltage circuits or only the low-voltage circuit.

17. The system of claim 16 wherein the input signal is one of a key-on signal and a key-off signal, the electrical demand state defining a low-voltage power demand when the input signal is the key-off signal, the switch system being a change-over switch that is controlled by the controller to connect the battery to the low-voltage circuit.

18. The system of claim 16 wherein a DC/DC converter is electrically connected to the battery and the low-voltage circuit.

19. The system of claim 18 wherein the switch system includes two connector switches having a negative contactor configured to connect a negative terminal of the battery to a negative connector of the low-voltage circuit and a negative connector of the high-voltage circuit, and a positive contactor configured to connect a positive terminal of the battery to a positive connector of the low-voltage circuit and a positive connector of the high-voltage circuit.

20. The system of claim 18 wherein the switch system is one change-over switch having a positive input circuit terminal and a negative input circuit terminal, positive and negative high/low-voltage circuit terminals and positive and negative low-voltage circuit terminals, the change-over switch being configured to connect one of the positive and negative high/low-voltage circuit terminals and the positive and the negative low-voltage circuit terminals to respective positive and negative terminals of the battery.

* * * * *